Feb. 15, 1955

G. E. ALPHIN, JR 2,702,134

TOBACCO HARVESTER

Filed July 29, 1952

Gilbert E. Alphin, Jr.
INVENTOR.

Feb. 15, 1955  G. E. ALPHIN, JR  2,702,134
TOBACCO HARVESTER
Filed July 29, 1952  4 Sheets-Sheet 4

Gilbert E. Alphin, Jr.
INVENTOR.

BY
Attorneys

United States Patent Office 2,702,134
Patented Feb. 15, 1955

2,702,134

TOBACCO HARVESTER

Gilbert E. Alphin, Jr., Kenansville, N. C.

Application July 29, 1952, Serial No. 301,561

6 Claims. (Cl. 214—83.1)

This invention relates in general to harvesting machinery, and more specifically to a mobile tobacco harvester.

At the present time in the southern tobacco growing States a single field of tobacco is harvested on the average of six times with the individual leaves of the tobacco plants being picked as they ripen. Inasmuch as the tobacco plants are grown out in the open and the leaves are disposed at a relatively low level the picking of the ripe tobacco leaves from tobacco plants becomes a back breaking job which must be done out under the broiling sun. Due to this fact, the southern tobacco growers are now finding it difficult to hire local help for this harvesting operation. It is, therefore, desirable to provide a suitable tobacco harvester which will eliminate the back bending and place the pickers out of the sun.

The manufacturers of farm equipment are now producing practically every type of implement which may increase the production of a farmer and at the same time lessen the work load on him. However, in spite of the advances made in the recent years in farming equipment there is still lacking a suitable device for harvesting tobacco with the result that the tobacco is still being picked by hand and the only machinery being utilized is a tractor for drawing tobacco wagons from the field to the barns where the tobacco is cured.

The primary object of this invention is to provide an improved tobacco harvester which may be driven through a field of tobacco carrying workmen in a relatively relaxed position whereby they may pick the ripe leaves from tobacco plants while in a relatively comfortable position.

Another object of this invention is to provide an improved tobacco harvester which is mobile and which may be driven through a tobacco field with certain workmen positioned thereon picking tobacco while other workmen are wrapping the tobacco into hands and mounting the same on sticks for curing.

Another object of this invention is to provide an improved tobacco harvester which may be utilized in the picking of the ripe leaves from tobacco plants and which is provided with a conveyor for conveying bunches of picked leaves to a hand forming station whereby the bunches of leaves are wrapped into hands, said leaves being free from crushing and the direct heat of the sun.

Another object of this invention is to provide an improved tobacco harvester which includes an elevated platform having depending therefrom a plurality of workmen's supports, said workmen's supports being so secured to the platform whereby they may be spaced as desired to accommodate various widths of tobacco rows.

Another object of this invention is to provide an improved tobacco harvester which may be simultaneously utilized for the picking of leaves from tobacco plants and the dusting of the plants after the ripe leaves have been gathered therefrom.

Another object of this invention is to provide an improved tobacco harvester which may be conveniently mounted on a wheeled vehicle, such as a tractor, for movement thereby to a tobacco field, said tobacco harvester being easily and quickly removed from a tractor with which it is associated.

A further object of this invention is to provide an improved tobacco harvester which may be easily and quickly converted into a harvester for corn or similar farm products in addition to be convertible into a tobacco planter and the like.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a side elevational view of the tobacco harvester which is the subject of this invention and shows the same mounted on a tractor for movement thereby, a foldable awning being mounted at the forward end of the tobacco harvester and being shown in dotted lines, and a corn receiving hopper being mounted at the forward end of a conveyor of the harvester for use when the harvester is being utilized for gathering corn;

Figure 2 is a transverse horizontal sectional view taken through the top awning portion of the tobacco harvester of Figure 1 along section line 2—2 and shows the general arrangement of the workmen's supports and the work stations mounted on the platform thereof, a portion of the platform being broken away in order to clearly illustrate the manner in which a conveyor is driven by the tractor and the platform is supported from the tractor;

Figure 5 is an enlarged fragmentary side elevational view of a forward end of the conveyor of the tobacco harvester and shows the same mounted with the hopper receiving ears of corn when the harvester is utilized for picking corn, portions of the hopper being broken away and shown in section in order to clearly illustrate the construction thereof;

Figure 6 is an enlarged fragmentary transverse vertical sectional view taken substantially upon the plane indicated by the section line 6—6 of Figure 4 and shows the general construction of the frame of the tobacco harvester and relationship of the platform supported thereby;

Similar characters of reference designate similar or identical elements and portions throughout the specification and throughout the different views of the drawings.

Figure 1:
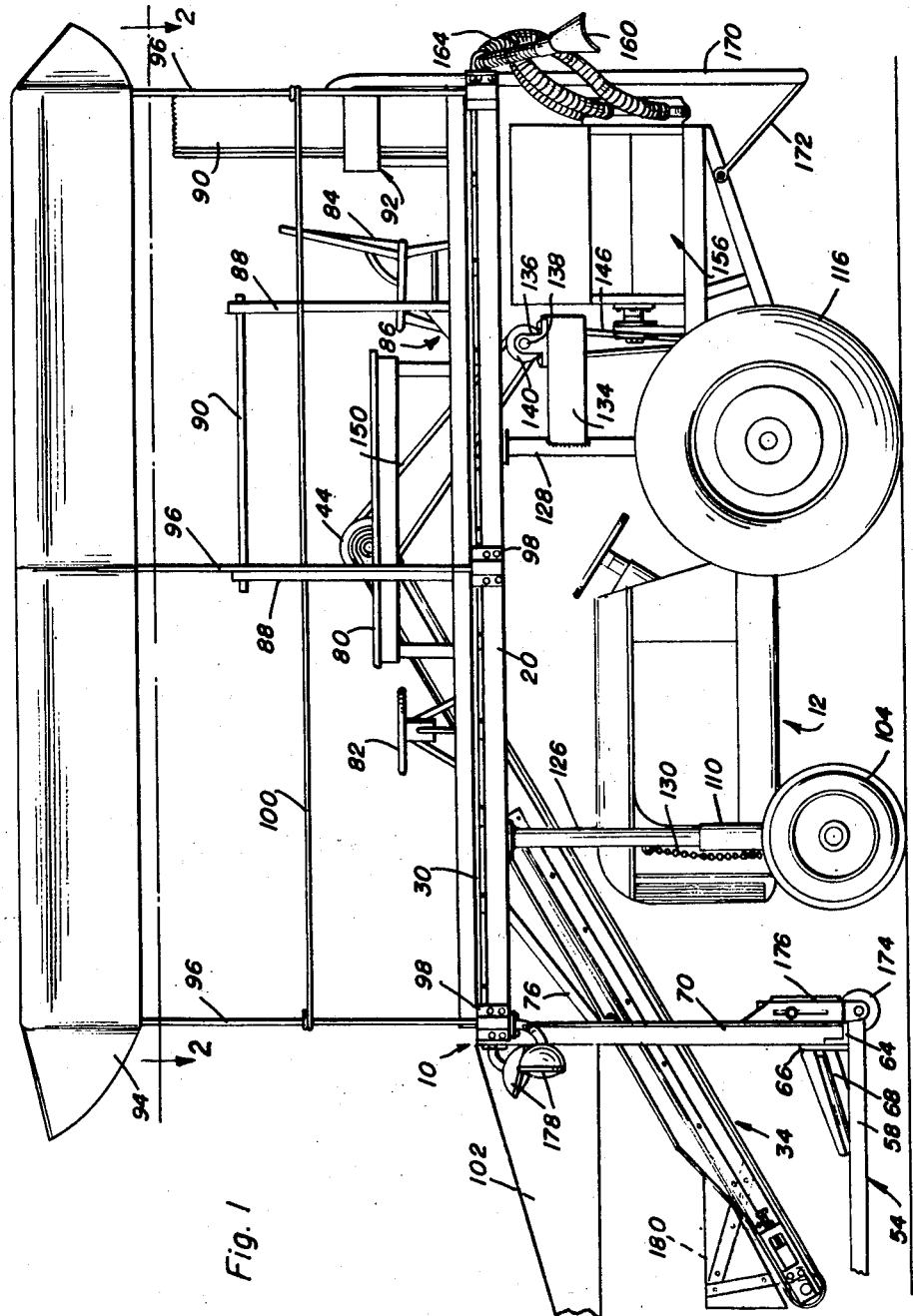

Referring now to the drawings in detail, it will be seen that the tobacco harvester, which is the subject of this invention, is referred to in general by the reference numeral 10 and is mounted for movement on a suitable farm tractor which is referred to in general by the reference numeral 12. It will be understood that the assembly is completely mobile and that the tractor, when provided with the tobacco harvester 10, is adapted to run down a path in a tobacco field between rows of tobacco, said path being formed by omitting each fifth row of tobacco so as to facilitate the removal of the tobacco from the field.

The tobacco harvester has a main support in the form of an elevated generally rectangular frame which is referred to in general by the reference numeral 14. The frame 14 includes a generally rectangular border formed by a front frame member 16, a rear frame member 18 and a pair of spaced parallel side frame members 20. The frame 14 also includes a front intermediate frame member 22 which extends transversely between the side frame members 20 and is rigidly secured to the same at points rearwardly of their connection to the front frame member 16. A similar rear intermediate frame member 24 is provided, the intermediate rear frame member 24 being in spaced parallel relation to the rear frame member 18. The frame members are preferably formed of channel members although other structural shapes may be utilized as desired.

Figure 2:
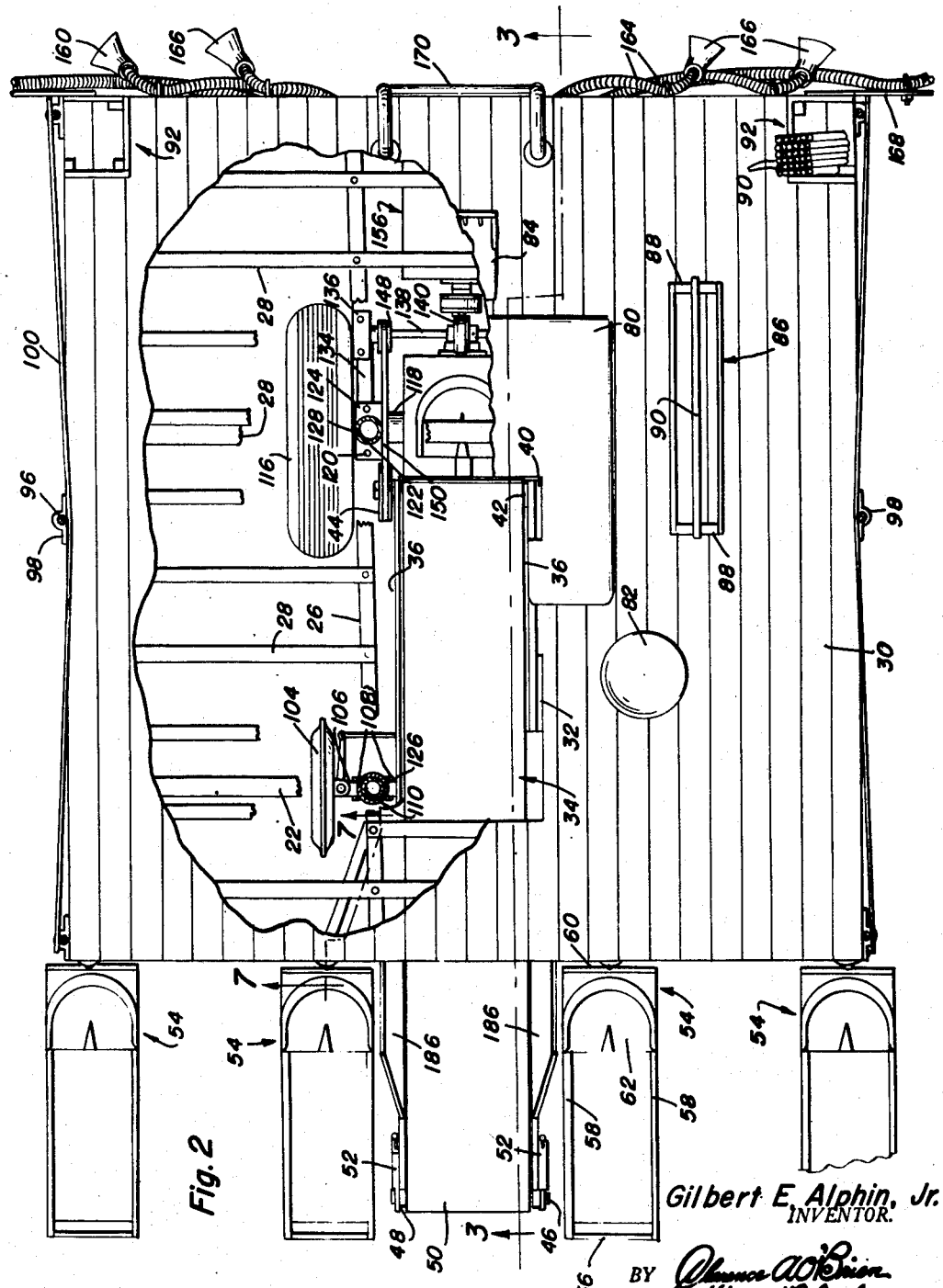

Referring now to Figure 2 in particular, it will be seen that the frame 14 also includes a pair of longitudinally extending frame members which are referred to by the reference numeral 26. The longitudinal frame members 26 are preferably formed of pipes which pass through and are secured to the webs of the intermediate frame members 22 and 24. The longitudinal frame members 26 terminate at their intersections with the front and rear frame members of the frame 14.

Overlying the frame 14 and secured to the frame elements thereof by suitable fasteners are a plurality of transversely extending floor joists 28 which may be formed of conventional wood framing. The joists 28 have overlying the same floor boards which form a flooring of a platform 30.

The platform 30 is provided with a centrally located opening 32 therethrough through which projects an upper end of a conveyor which is referred to in general by the reference numeral 34. The conveyor 34 includes a pair of longitudinally extending side frame members 36 which pass through the two longitudinal frame members 26 and beneath the front intermediate frame member 22. The side frame members 36 of the conveyor 34 are connected to the front intermediate frame member 22 by suitable fastening means. The fastening means is preferably in the form of a pair of diagonal braces 38 although other suitable means may suffice.

The conveyor 34 also includes a drive shaft 40 disposed at the rear end thereof and extending between the side frame members 36 in which the same is journaled. The shaft 40 has mounted thereon a drive roller 42 which is positioned between the side frame members 36. One end of the drive shaft 40 extends outwardly beyond one of the side frame members 36 and has mounted thereon a drive pulley 44. The front end of the conveyor 34 includes an idler shaft 46 which extends between and is journaled in the front ends of the side frame members 36. The idler shaft 46 has mounted thereon an idler drum 48. Entrained over the drums 42 and 48 is an endless conveyor belt 50 adapted to transport tobacco from a point adjacent the ground at the front of the tobacco harvester 10 to a point on the platform 30. In order that the conveyor belt 50 may be tensioned, the idler shaft 46 is adjustably mounted in a pair of adjustable mounting brackets 52 carried by the front ends of the side frame members 36.

Carried at the front of the frame 14 and suspended from the front frame member 16 in spaced parallel relation is a plurality of workmen's supports which are referred to in general by the reference numeral 54. Inasmuch as the workmen's supports are identical, only one of the same will be described in detail.

Each workman's support 54 includes a generally rectangular frame formed of a front frame member 56, side frame members 58, and a rear frame member 60. Mounted on the side frame members 58 adjacent the rear frame member 60 is a suitable seat 62 in which may be seated a workman. The front frame member 56 forms a foot rest for the workman seated in the seat 62 so as to provide a proper support for his feet.

Referring now to Figure 1 in particular, it will be seen that overlying the rear frame member of the frame of the workman's support 54 is a rearwardly facing angle member 64. Also extending transversely of the frame and secured to the side frame members 58 thereof is a vertical plate 66, the vertical plate being secured in face to face relation with the vertical flange of the angle member 64. Extending forward and downwardly from the ends of the plate 66 are diagonal braces 68 for rigidly supporting the frame.

Figure 7:
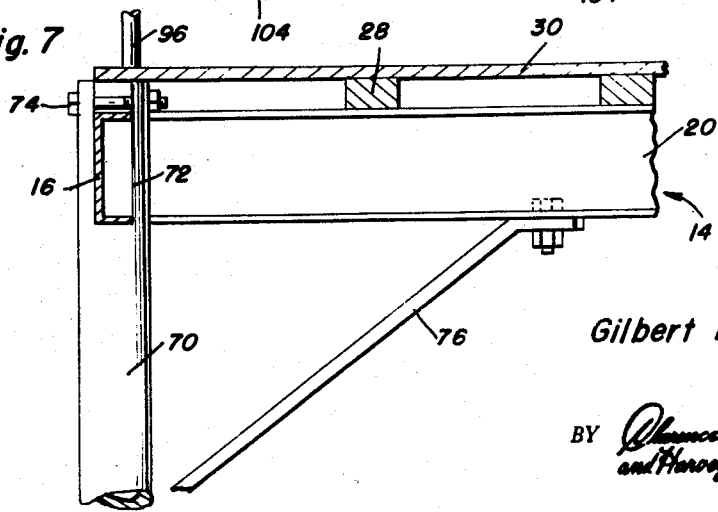
Figure 7 is an enlarged fragmentary longitudinal vertical sectional view taken substantially upon the plane indicated by the section line 7—7 of Figure 2 and shows the manner in which standards of the workmen's supports are adjustably connected to the frame of the tobacco harvester.

Secured to the angle member 64 and the plate 66 centrally thereof is a vertically extending tubular standard 70. As is best illustrated in Figure 7, the upper end of the tubular standard is provided with an elongated slot 72 in which may be received the front frame member 16. The slot 72 is of a greater depth than the height of the front frame member 16 and the ends of the standard 70 formed by the same extend upwardly beyond the top of the frame member. These ends are connected by a transversely extending fastener 74 which prevents the removal of the standard 70 but does not limit the sliding movement of the same with respect to the frame member.

Should it be found necessary to brace the standards 70 against swinging in longitudinal planes, the frame members of the frame 14 may have secured thereto one end of a suitable angle brace 76 whose other end is secured to an associated standard 70 adjacent the upper end thereof.

Figure 4:
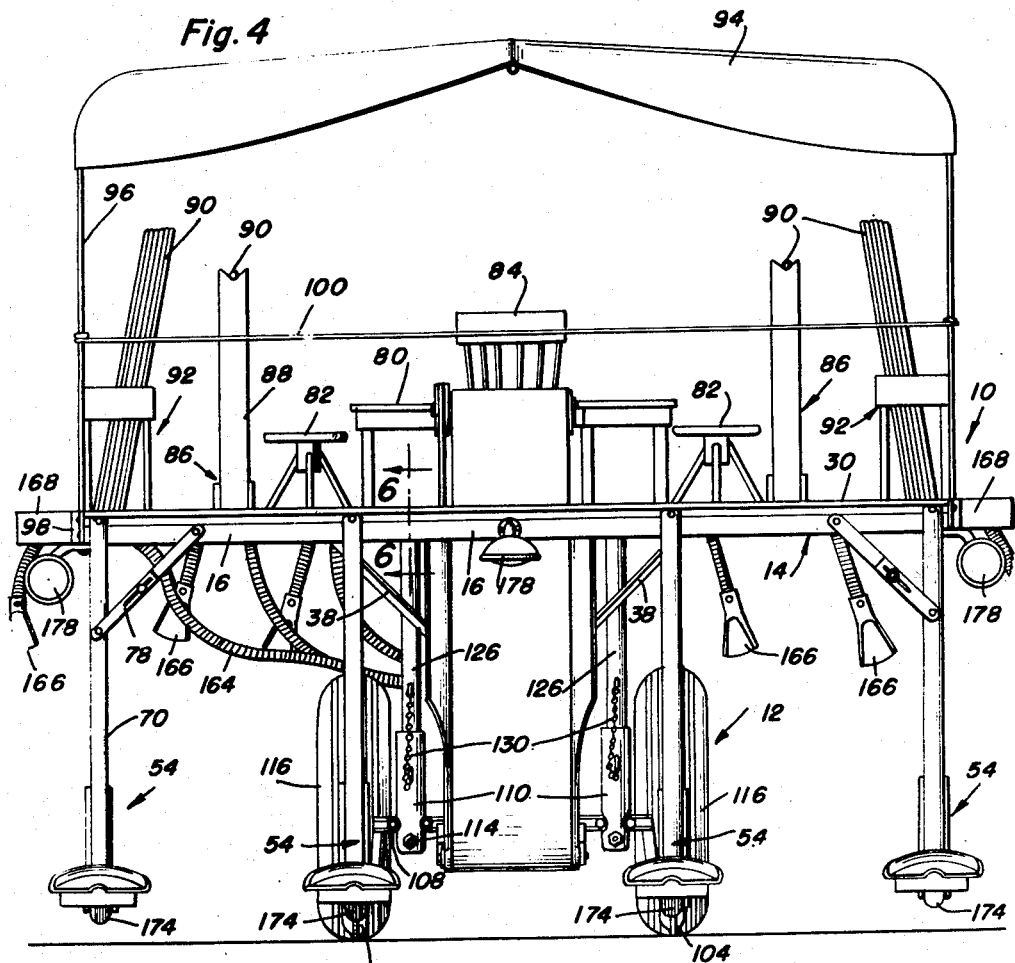
Figure 4 is a front elevational view of the tobacco harvester of Figure 1 and shows the general relationship of the various portions thereof with respect to each other and the tractor on which the tobacco harvester is mounted.

Referring now to Figure 4 in particular, it will be seen that the outermost standards are disposed at slight angles to the vertical so that the spacing of the lower portion of the workmen support with respect to its adjacent workmen support is increased. The standards 72 are held in these positions by adjustable diagonal braces 78 which are secured at their ends to the front frame member 16 and the standard 70 by suitable fasteners.

While the workmen's supports 54 have been illustrated and described as being secured to the front frame member 16 of the frame 14, it will be understood that the same may be also secured to the side frame members 20 if it is found to be so desired.

It will be noted that the front end of the conveyor 34 is disposed between the two central workmen's supports 54 in a position whereby a workman seated thereon may conveniently lay tobacco leaves on the conveyor belt 50 for movement to a work station on the platform 30. The work station 30 includes a generally U-shaped table 80 which partially surrounds the upper end of the conveyor 34. Mounted on the platform 30 adjacent the forward ends of the table 80 is a pair of suitable seats 82 on which may be seated workmen who remove the tobacco leaves from the conveyor belt 50 and tie the same into hands. Should the workmen seated on the seats 82 be unable to keep up with the workmen carried by the workmen's supports 54, another workman seated on a suitable seat 84 at the rear of the table 80 will position the excess tobacco leaves on the top of the same and move them towards the workmen on the seats 82 in order that they may tie the same during a slack period. It is also understood that the workman seated on the seat 84 may be engaged in a hand forming operation should it be necessary.

Positioned adjacent the opposite sides of the table 80 are suitable tobacco stick supports 86. Each tobacco stick support 86 includes a pair of longitudinally spaced aligned vertical support members 88 which are provided with generally V-shaped notches in their upper ends. Tobacco sticks 90 are adapted to be carried by the support members 88 and have received thereon hands tied by the workmen seated on the seats 82. It will be understood that the hands of tobacco leaves are placed on the tobacco sticks by other workmen who receive the same from the workmen seated on the seats 82. After a tobacco stick 90 has been filled with hands of tobacco, the same may be either laid on the forward portions of the platform 30 or mounted in suitable racks (not shown).

Formed at the rear corners of the platform 30 are suitable racks 92 which extend vertically upwardly therefrom. The racks 92 are of such a size and shape so as to conveniently hold extra tobacco sticks prior to their mounting in the support 86.

It will be noted that the platform 30 is covered by a suitable awning 94 which is supported by a plurality of inverted U-shaped supports 96. The supports 96 have their lower ends seated in suitable sockets 98 secured to the other sides of the side frame members 20 of the frame 14. The supports 96 are also laced together intermediate their ends by a suitable lacing 100.

Referring to Figure 1 in particular, it will be seen that there is illustrated by broken lines a second awning 102. The awning 102 may be of any suitable design but is preferably foldable whereby the same may be raised out of overlying relation with the workmen's supports 54. The awning 102 is primarily intended to protect the workmen seated on the workmen's supports 54 from the direct rays of sun although it is helpful in protecting the tobacco disposed upon the conveyor 34 from the direct rays of the sun.

It will be understood, that although the tobacco harvester 10 has been illustrated as being mounted on the tractor 12, that the same may be mounted on any suitable wheeled frame.

Figure 3:
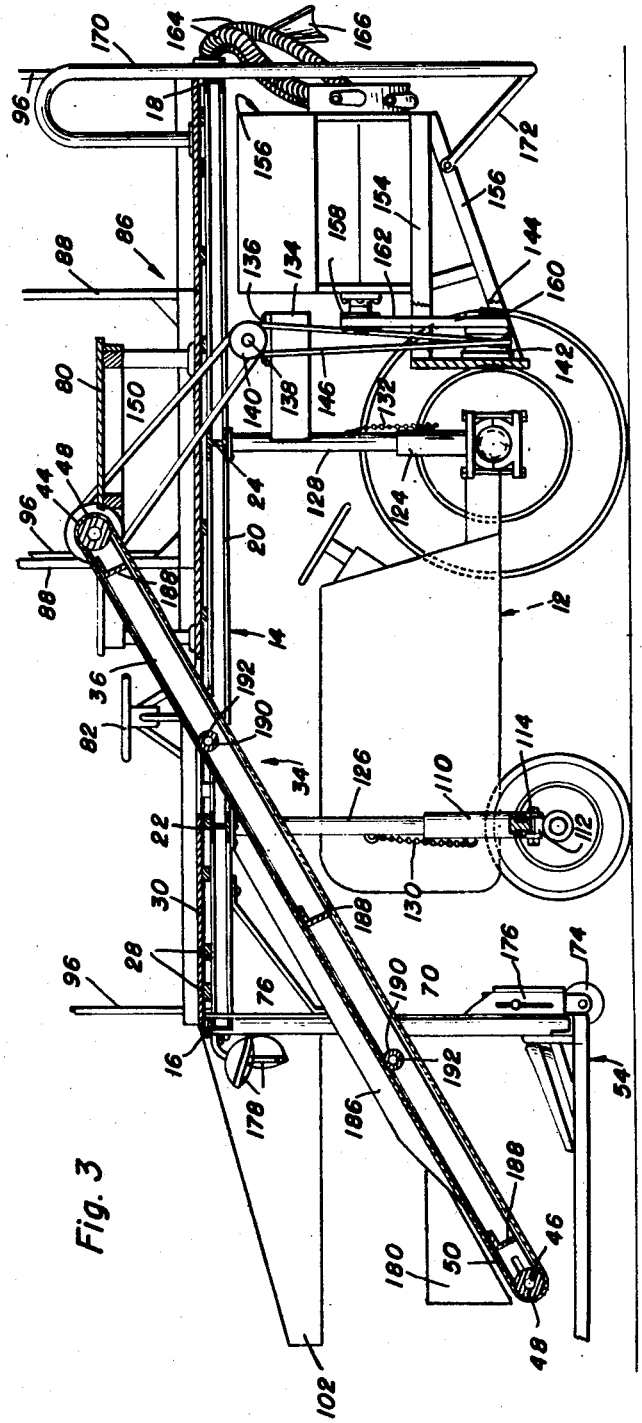
Figure 3 is a fragmentary longitudinal vertical sectional view taken substantially upon the plane indicated by the section line 3—3 of Figure 2 and shows the general construction of the tobacco harvester and the tractor on which it is mounted, the tractor being shown by broken lines.

The tractor 12, which is a conventional tractor, includes front wheels 104 supported by an outwardly extending front axle 106. The front axle 106 may be of the type wherein implements are connected thereto by a plurality of bolts 108. Mounted on the axle 106 adjacent each end thereof is a tubular mounting bracket 110 whose purpose will be explained in more detail hereinafter. As is best illustrated in Figure 3 and 4, the tubular mounting bracket 110 is provided with an elongated downwardly opened slot 112 at its lower end for receiving the axle 106. Also, the sides of the mounting bracket 110 are recessed in order to provide clearance for the bolts 108.

When it is desired to install one of the front mounting brackets 110, the same is disposed at a slight angle to the vertical paths between adjacent bolts 108. The individual mounting brackets 110 are then moved to the vertical position illustrated and if desired, may be provided with a suitable fastener 114 disposed below the axle 106 to prevent removal of the mounting bracket. The tractor 12 also includes a pair of rear wheels 116 which are mounted on the ends of the rear axles, the rear axles being supported by rear axle housings 118 which extend outwardly from opposite sides of the tractor frame. The tractor 12 is normally equipped with fenders for protecting the operator of the same from mud and other foreign matter being thrown by the rear wheels 116. These fenders have been removed from the tractor 12 and secured to the rear axle housings 118 by suitable fasteners 120 of the type normally utilized for attaching the fenders is a mounting plate 122. The mounting plate 122 has secured to the upper surface thereof an upwardly directed tubular rear mounting bracket 124. It will be understood that there is one such tubular mounting bracket 124 on each side of the tractor. While one specific means by which the tubular mounting brackets 110 and 124 are secured to the tractor 12 has been illustrated and described, it will be understood that the securing method will vary for different types of tractors.

Telescoped within the front mounting brackets 110 are front tubular standards or supports 126. The frame 14 is so designed that the upper ends of the front tubular standards 126 engage the front intermediate frame member 22 at its intersection with the longitudinal frame members 26. In this manner the joint between the front standards 126 and the front intermediate frame member 22 is greatly reinforced.

The rear mounting brackets 124 also have telescoped therein rear standards or supports 128. The rear standards extend upwardly from the rear mounting brackets 124 and have their upper ends secured to the lower flange of the rear intermediate transverse frame member 28 at its intersections with the longitudinal frame members 26.

It will be understood that the front standards 126 normally have their lower ends supported directly by the front axle 106 and that their lower end portions are merely guided by the front mounting bracket 110. Should one of the front wheels of the tractor 12 drop into a sink hole or the like, the frame 14 will have a tendency to remain level and the mounting bracket 110 associated with the particular front wheel will move downwardly with respect to the associated front standard 126. In order that the standards 126 may not accidentally move all the way out of their respective mounting brackets 110, they are connected to the same by links of flexible connecting material 130 which may be in the form of chains.

The rear standards 128 are supported with the rear mounting brackets 124 in a similar manner, but engage the plates 122 at their lower ends. The rear standards 128 are also connected to their mounting brackets 124 by flexible connecting members 132 to prevent accidental separation of the same.

Referring now to Figure 3 in particular, it will be seen that carried by the rear standards 128 and extending rearwardly therefrom are horizontal support arms 134. The horizontal support arms 134 have mounted on the upper flanges thereof suitable pillow blocks 136. The pillow blocks 136 are transversely aligned and have rotatably mounted therein a transversely extending shaft 138.

The shaft 138 has mounted thereon a pulley 140 which is substantially in alignment with a first pulley 142 carried by a power take-off shaft 144 of the tractor 12. Extending between and entrained over the pulleys 140 and 142 is a first drive belt 146.

Also carried by the shaft 138 in longitudinal alignment with the drive pulley 44 of the conveyor 34 is a pulley 148. Entrained over and extending between the pulleys 44 and 148 is a drive belt 150 which rotates the drive shaft 40 to cause movement of the conveyor belt 50 upon rotation of the power take-off shaft 144.

Referring now to Figure 3 in particular, it will be seen that carried by the rear of the tractor 12 is a transversely extending vertical mounting plate 152. Extending rearwardly therefrom is a platform 154 which is braced from the mounting plate 152 by a plurality of diagonal braces 156. Carried by the platform 154 is a suitable dusting machine 157. The dusting machine 157 includes a drive shaft on which is mounted a drive pulley 158. The drive pulley 158 is in vertical alignment with a second pulley 160 mounted on the power take-off shaft 144. Extending between and entrained over the pulleys 158 and 160 is a drive belt 162 for driving the duster 157.

Extending from the other side of the duster 157 is a plurality of flexible dust lines 164 which terminate in dusting heads 166. The dusting heads 166 are supported by either the rear frame member 18 of the frame 14 or by extensions 168 secured thereto and extending outwardly from the rear of the tobacco harvester 10. It will be understood that the dusting mechanism may be utilized while a tobacco harvesting operation is in process so as to combine two operations in one.

Disposed at the rear of the platform 30 and secured thereto is an inverted J-shaped ladder 170. The ladder 170 is of a conventional construction and is utilized for gaining access from the ground to the platform 30. The lower end of the ladder 170 is braced by a diagonal brace 172 whose forward end is connected to one of the diagonal braces 156.

In order to facilitate the removal of the tobacco harvester 10 from the tractor and also to engage the ground in the event that any of the wheels drop into sink holes or the like, the standards 70 of the workmen's supports 54 have mounted thereon ground engageable wheels 174. The wheels 174 are connected to their respective standards by suitable mounting brackets 176.

When it is desired to remove the tobacco harvester 10 from the tractor 12, the two central workmen's supports 54 are moved out of alignment with the wheels of the tractor and the two outer workmen's supports are detached from the front frame member 16 and secured to the rear frame member 18. The tractor 12 is then driven between a pair of sloping runways which engage the wheels 174. The action of the sloping runways is to raise the front and rear standards 126 and 128 out of their respective mounting brackets and permit the tractor 12 to drive on without the tobacco harvester 10. It will be understood that certain of the connections between the tobacco harvester and the tractor 12 must be disconnected prior to this operation. It will also be understood that the tractor harvester may be mounted back on the tractor 12 by a reversal of the above outlined operation. During a tobacco harvesting operation, the tractor 12 with the tobacco harvester 10 mounted thereon is driven down the path between adjacent rows of tobacco plants. Seated on each of the workmen's supports 54 is a workman whose job is to remove the ripe leaves from the tobacco plants. Each workman accumulates a handful of leaves which is sufficient to form a hand of tobacco, as outlined above, the grouped or bunch of leaves is then placed on the conveyor belt 50 and moved upwardly where they are formed into hands. It will be understood that inasmuch as the conveyor belt is continuously moving that no bunch of tobacco leaves will be disposed on other tobacco leaves and, therefore, bruising of the same is prevented. Furthermore, inasmuch as the picked tobacco leaves remain under cover there is no sudden drying of the same prior to their hanging in a suitable storage shed.

Inasmuch as the workmen picking the tobacco leaves from the tobacco plants are seated in a comfortable position and protected from the direct rays of the sun the tobacco picking operator becomes more efficient. Furthermore, inasmuch as the bunches of tobacco leaves are moved directly to the hand formers without engagement with other tobacco leaves no entanglement of the leaves result and the hands may be quickly formed. A further advantage of the present tobacco harvester is in that the platform 30 is elevated and the tobacco stick loaded with hands of tobacco may be passed into a suitable storage shed or barn at a raised level whereby the raising of the tobacco up into the top of the barn is greatly facilitated.

Inasmuch as it is necessary that the tobacco leaves be picked as soon as they ripen, it is desirable that the tobacco picking operation proceed on schedule. Should it be necessary, the tobacco harvester may be provided with suitable lights, such as the lights 178, for night work. The lights 178 would be powered from the electrical system of the tractor 12.

The tobacco harvester 10 also has a further advantage inasmuch as it may be utilized for harvesting corn crops. When the tobacco harvester 10 is utilized for harvesting corn crops there is mounted on the forward end of the conveyor 34 a suitable hopper 180. The hopper 180 is maintained in position by braces 182 and 184 which are secured to the side frame members 36 thereof. The hopper is necessary inasmuch as the ears of corn would have a tendency to roll off the lower end of the conveyor belt 50 or outer sides thereof inasmuch as side shields 186 of the conveyor 34 terminate short of the lower end thereof.

Referring now to Figure 3 in particular, it will be seen that the conveyor 34 may also include intermediate transverse frame members 188 which connect together the side frame members 36. Also, the conveyor belt 50 may be supported intermediate the rollers 42 and 48 by intermediate rollers 190 mounted on idler shafts 192.

The above mentioned attachments are merely a few of the attachments which may be conveniently connected to the tobacco harvester 10 for either planting, working or harvesting other crops.

Also, I would like to mention the fact that during tobacco harvesting time it is necessary to top and sucker tobacco near the same number of times that the leaves are harvested. This machine is so arranged as to carry two or more workmen for that purpose, suspended on each side in the same manner and on the same type of supports as the ones used in front for tobacco pickers. This enables the farmer or supervisor driving the vehicle to supervise the picking of ripe leaves of tobacco, suckering and topping, handing and tying, and dusting the tobacco all in one operation, with all of his help gathered on one vehicle in relatively comfortable positions out of the sun.

The statistics show that a great majority of all tobacco farmers, as well as other farmers, have tractors. During tobacco harvesting season there is very little help that the tractor has been to the tobacco farmer, since there was no equipment made to attach to the tractor for harvesting tobacco. By the use of this machine the tobacco farmer is enabled to use his tractor to a greater advantage and without any additional cost for powering the harvester.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A mobile tobacco harvester comprising a generally rectangular workman supporting platform, said platform having a plurality of spaced supports depending therefrom, said supports having on their lower ends means for attachment to tractor axles, said platform having a forward end portion, said forward end portion having a plurality of transversely aligned depending standards, each having on its lower portion a workman's station, said platform having an opening therethrough, an elevating conveyor extending through said opening and extending from adjacent said workman's stations to a point above said platform, whereby workmen on said stations may pick tobacco leaves and place the same on said conveyor for movement above said platform where they are received by other workmen.

2. A mobile tobacco harvester comprising a generally rectangular workman supporting platform, said platform having a plurality of spaced supports depending therefrom, said supports having on their lower ends means for attachment to tractor axles, said platform having a forward end portion, said forward end portion having a plurality of transversely aligned depending standards, each having on its lower portion a workman's station, said platform having an opening therethrough, an elevating conveyor extending through said opening and extending from adjacent said workman's stations to a point above said platform, whereby workmen on said stations may pick tobacco leaves and place the same on said conveyor for movement above said platform where they are received by other workmen, said forward end portion including a forward transverse frame member, said standards being adjustably positioned on said frame member to accommodate various row spacings.

3. A mobile tobacco harvester comprising a generally rectangular workman supporting platform, said platform having a plurality of spaced supports depending therefrom, said supports having on their lower ends means for attachment to tractor axles, said platform having a forward end portion, said forward end portion having a plurality of transversely aligned depending standards, each having on its lower portion a workman's station, said platform having an opening therethrough, an elevating conveyor extending through said opening and extending from adjacent said workman's stations to a point above said platform, whereby workmen on said stations may pick tobacco leaves and place the same on said conveyor for movement above said platform where they are received by other workmen, said platform including a border framing extending about the general periphery thereof, said standards being adjustably carried by said border framing for selective positioning thereabout.

4. A mobile tobacco harvester comprising a generally rectangular workman supporting platform, said platform having a plurality of spaced supports depending therefrom, said supports having on their lower ends means for attachment to tractor axles, said platform having a forward end portion, said forward end portion having a plurality of transversely aligned depending standards, each having on its lower portion a workman's station, said platform having on opening therethrough, an elevating conveyor extending through said opening and extending from adjacent said workman's stations to a point above said platform, whereby workmen on said stations may pick tobacco leaves and place the same on said conveyor for movement above said platform where they are received by other workmen, said platform including a border framing extending about the general periphery thereof, said standards being adjustably carried by said border framing for selective positioning thereabout, certain of said standards being movable to a rear portion of said border framing to support the rear of said platforms when removed from a tractor.

5. A mobile tobacco harvester comprising a generally rectangular workman supporting platform, said platform having a plurality of spaced supports depending therefrom, said supports having on their lower ends means for attachment to tractor axles, said platform having a forward end portion, said forward end portion having a plurality of transversely aligned depending standards, each having on its lower portion a workman's station, said platform having an opening therethrough, an elevating conveyor extending through said opening and extending from adjacent said workman's stations to a point above said platform, whereby workmen on said stations may pick tobacco leaves and place the same on said conveyor for movement above said platform where they are received by other workmen, said workman's supports being provided with ground engageable wheels for facilitating removal of said platform from a tractor.

6. A mobile tobacco harvester comprising a generally rectangular workman supporting platform, said platform having a plurality of spaced supports depending therefrom, said supports having on their lower ends means for attachment to tractor axles, said platform having a forward end portion, said forward end portion having a plurality of transversely aligned depending standards, each having on its lower portion a workman's station, said platform having an opening therethrough, an elevating conveyor extending through said opening and extending from adjacent said workman's stations to a point above said platform, whereby workmen on said stations may pick tobacco leaves and place the same on said conveyor for movement above said platform where they are received by other workmen, said means including tubular mounting brackets detachably receiving said lower ends of said standards, mounting means on said mounting brackets for attachment to a tractor.

References Cited in the file of this patent

UNITED STATES PATENTS

| | | | |
|---|---|---|---|
| 223,468 | Benthall | Jan. 13, | 1880 |
| 775,456 | O'Shaughnessy | Nov. 22, | 1904 |
| 843,294 | O'Shaughnessy | Feb. 5, | 1907 |
| 881,598 | Loxley | Mar. 10, | 1908 |
| 908,342 | Short et al. | Dec. 29, | 1908 |
| 1,213,151 | Coyo | Jan. 23, | 1917 |
| 1,275,781 | Stark | Aug. 13, | 1918 |
| 1,629,422 | Trulove | May 17, | 1927 |
| 2,267,234 | Garber | Dec. 23, | 1941 |
| 2,312,075 | Chromy | Feb. 23, | 1943 |
| 2,378,143 | Jensen | June 12, | 1945 |
| 2,378,847 | Harris | June 19, | 1945 |
| 2,518,965 | Whitley | Aug. 15, | 1950 |
| 2,524,181 | Sivertson | Oct. 3, | 1950 |
| 2,560,729 | Lynn et al. | July 17, | 1951 |
| 2,622,385 | Caraganis | Dec. 23 | 1952 |